(12) United States Patent
Liepelt et al.

(10) Patent No.: US 10,291,846 B2
(45) Date of Patent: May 14, 2019

(54) METHOD FOR PRODUCING AN OVERALL IMAGE OF SURROUNDINGS OF A VEHICLE, AND CORRESPONDING DEVICE

(71) Applicant: Robert Bosch GmbH, Stuttgart (DE)

(72) Inventors: David Liepelt, Stuttgart (DE); Jose Domingo Esparza Garcia, Stuttgart (DE); Matthias Mayerle, Stuttgart (DE); Raphael Cano, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/569,656

(22) PCT Filed: Mar. 21, 2016

(86) PCT No.: PCT/EP2016/056130
§ 371 (c)(1),
(2) Date: Oct. 26, 2017

(87) PCT Pub. No.: WO2016/177506
PCT Pub. Date: Nov. 10, 2016

(65) Prior Publication Data
US 2018/0115707 A1   Apr. 26, 2018

(30) Foreign Application Priority Data
May 6, 2015 (DE) .......................... 10 2015 208 343

(51) Int. Cl.
*B60R 1/00* (2006.01)
*G06T 3/40* (2006.01)
(Continued)

(52) U.S. Cl.
CPC ........... *H04N 5/23238* (2013.01); *B60R 1/00* (2013.01); *G06T 3/4038* (2013.01);
(Continued)

(58) Field of Classification Search
CPC ........ B60R 2300/105; B60R 2300/303; B60R 1/00; G06T 3/4038; H04N 5/23238; H04N 5/23293; H04N 5/247
See application file for complete search history.

(56) References Cited

U.S. PATENT DOCUMENTS

| | | | |
|---|---|---|---|
| 2009/0059005 A1* | 3/2009 | Hattori | B60R 1/00 348/148 |
| 2010/0245577 A1* | 9/2010 | Yamamoto | B60R 1/00 348/148 |

(Continued)

FOREIGN PATENT DOCUMENTS

| | | |
|---|---|---|
| DE | 10256612 B3 | 7/2004 |
| DE | 102013220669 A1 | 5/2014 |

(Continued)

OTHER PUBLICATIONS

International Search Report dated Jul. 5, 2016, of the corresponding International Application PCT/EP2016/056130 filed Mar. 21, 2016.

*Primary Examiner* — Huy T Nguyen
(74) *Attorney, Agent, or Firm* — Norton Rose Fulbright US LLP; Gerard Messina

(57) ABSTRACT

A method for producing an overall image of surroundings of a vehicle using images that are each actively recorded by one of a plurality of cameras mounted on the vehicle. The method includes determining a position of each predefined image section that occurs in an image of the plurality of images that at least partly forms an image of a vehicle body and/or of a vehicle wheel, using an image mask associated with the respective image to mask a portion of each of the plurality of images, in which a predefined image section occurs; determining each image mask on the basis of the position determined for each predefined image section located in the associated image in such a way that it masks each predefined image section that occurs in the associated (Continued)

image, and producing the overall image by assembling the plurality of images.

5 Claims, 3 Drawing Sheets

(51) Int. Cl.
*H04N 5/232* (2006.01)
*H04N 5/247* (2006.01)

(52) U.S. Cl.
CPC ......... *H04N 5/23293* (2013.01); *H04N 5/247* (2013.01); *B60R 2300/105* (2013.01); *B60R 2300/303* (2013.01)

(56) References Cited

U.S. PATENT DOCUMENTS

2010/0321489 A1* 12/2010 Chen .................. G01C 11/02
　　　　　　　　　　　　　　　　　　　　348/116
2012/0314072 A1　12/2012 Kiyo et al.
2015/0103172 A1*　4/2015 Shimizu ............ G06T 3/4038
　　　　　　　　　　　　　　　　　　　　348/148

FOREIGN PATENT DOCUMENTS

| EP | 2233359 A1 | 9/2010 |
| JP | 3300334 B2 | 7/2002 |
| JP | 2010114618 A | 5/2010 |

\* cited by examiner

METHOD FOR PRODUCING AN OVERALL IMAGE OF SURROUNDINGS OF A VEHICLE, AND CORRESPONDING DEVICE

FIELD

The present invention relates to a method and a corresponding device for producing an overall image of surroundings of a vehicle using a plurality of images. The plurality of images are actively recorded in each instance by one of a plurality of cameras mounted on the vehicle.

BACKGROUND INFORMATION

Conventional panoramic view systems for vehicles enable a two- or three-dimensional overall image of surroundings of a respective vehicle to be produced in each particular case.

One conventional panoramic view system includes four cameras that are mountable on a vehicle. When the four cameras of the panoramic view system are mounted on the vehicle, a corresponding overall image of surroundings of the vehicle is produced using a plurality of images that are each actively recorded by one of the four cameras. In these approaches, such an overall image displays the respective surroundings of the vehicle and a virtual model of the respective vehicle from a virtual perspective.

Using an image-based rendering method, the conventional panoramic view system enables a virtual camera to be freely guided to produce a previously mentioned virtual perspective around a virtual model of a respective vehicle.

German Patent Application No. DE 10 2013 220 669 A1 describes a method for displaying a recorded image on a display device. A scene is captured by at least one image recognition-based imaging system.

A virtual image of the captured scene is produced by a processor using a camera model. The processor performs a view synthesis technique on the captured image to produce a distortion-corrected virtual image. The distortion-corrected image is displayed on a rear-view mirror display device.

German Patent No. DE 102 56 612 B3 describes a method and a device for training drivers on a motor vehicle. A projection system overlays virtual, three-dimensional hazard scenarios from a storage medium onto a projection surface during a training drive over an off-road terrain.

SUMMARY

The present invention provides an example method for producing an overall image of surroundings of a vehicle using a plurality of images. The plurality of images are each actively recorded by one of a plurality of cameras mounted on the vehicle. The overall image thereby displays the surroundings of the vehicle and a virtual model of the vehicle from a virtual perspective. The method according to the present invention includes a first step of determining a position of each predefined image section that occurs in an image of the plurality of images and that at least partly forms an image of a vehicle body and/or of a vehicle wheel. The method according to the present invention also includes a second step of using an image mask associated with the respective image to mask a portion of each of the plurality of images in which a predefined image section occurs. The method according to the present invention also includes a third step of determining each image mask on the basis of the position determined for each predefined image section located in the associated image. In the third step, each image mask is determined to mask each predefined image section that occurs in the associated image. The method according to the present invention also includes a fourth step of producing the overall image by assembling the plurality of images subsequently to the masking thereof by the associated image masks.

Preferred embodiments of the present invention are described herein.

In the example method, the fourth step preferably includes displaying the overall image on a display unit.

In an example embodiment of the method, a fifth step is preferably carried out. The fifth step includes positioning the virtual model of the vehicle in an image region of the overall image whose position in the overall image corresponds to a position of the vehicle in the surroundings thereof.

In the example method, a sixth step is preferably performed. The sixth step includes determining the position of at least one predefined image section that occurs in an image of the plurality of images and at least partly forms an image of the vehicle body, on the basis of current intrinsic and extrinsic calibration parameters from one of the plurality of cameras that were used to actively record the respective image.

In a case where a predefined image section of an image of the plurality of images at least partly forms an image of the vehicle body, the respective, predefined image section always has one and the same position in the corresponding image where the respective camera is located in a predefined position. Consequently, to mask a predefined image section that at least partly forms an image of the vehicle body, an image mask is used for a predefined position of the corresponding camera that may be determined only once for the predefined position of the respective camera and, therefore, may also be referred to as a static image mask.

When an image mask is used to mask each predefined image section that at least partly forms an image of the vehicle body, the result is that an image of the vehicle body is not formed in a corresponding overall image. It is thereby advantageous for the virtual model of the vehicle to be clearly discernible in such an overall image since an image of the vehicle body is not superimposed thereon. This leads to an improved visualization of the vehicle surroundings.

It may be provided for an image mask to overlay one of the plurality of images in which a predefined image section may occur, that at least partly forms an image of a vehicle wheel, the image mask being determined to mask all possible positions during a movement of the respective vehicle wheel that may be assumed from the images thereof.

By using an image mask to mask each predefined image section that at least partly forms an image of a vehicle wheel, no unwanted projections of the vehicle wheels appear in a respective overall image. Such an unwanted projection may appear in an image region of the corresponding overall image by forming an image of a ground upon which the vehicle is situated. It is thereby advantageous that, in such an overall image, the vehicle surroundings are clearly discernible since the image thereof does not have the mentioned projections superposed thereon. This leads to an improved visualization of the vehicle surroundings.

In one embodiment of the present invention, a seventh step and an eighth step are preferably performed. The seventh step includes determining a current position of at least one vehicle wheel as a function of a current steering angle of the vehicle. The eighth step includes determining the position of at least one predefined image section that occurs in one of the plurality of images that at least partly forms an image of the at least one vehicle wheel, on the basis of the current position of the at least one vehicle wheel. In the eighth step, the position of the at least one respective, predefined image section is also determined on the basis of current intrinsic and extrinsic calibration parameters of one of the plurality of cameras that was used to actively record the respective image. In a case where a predefined image section of an image of the plurality of images at least partly forms an image of a vehicle wheel, a position of such a predefined image section in a respective image changes in response to a position of the respective vehicle wheel changing. This occurs even when one of the four cameras, that recorded a respective image, is located in a predefined position. Therefore, to mask a predefined image section, that at least partly forms an image of a vehicle wheel, an image mask is used, which may be adjusted in the respective image as a function of a current position of the respective, predefined image section and, therefore, may also be referred to as a dynamic image mask.

By using a dynamic image mask to mask each predefined image section that at least partly forms an image of a vehicle wheel, only a minimal surface is masked in the corresponding image. This prevents a loss of information that would occur if a relatively large surface of the respective image were masked. A suitable overall image makes it possible to provide a maximum possible amount of information on the vehicle surroundings.

In the case of a previously described method, a ninth and a tenth step are preferably performed. The ninth step includes creating or using a lookup table that includes a position of at least one predefined image section that may occur in each case in the corresponding position in an image of at least one of the plurality of cameras when the at least one camera is located in a predefined position. The tenth step includes taking the position of the at least one predefined image section from the lookup table when the at least one predefined image section occurs in the current image from the at least one camera. This makes it possible to more quickly determine an image mask that is supposed to mask a predefined image section whose position in the corresponding image is taken from the lookup table. The reason is that there is no need to first determine the position of such a predefined image section on the basis of current intrinsic and extrinsic calibration parameters of the corresponding camera. In a previously described method, an eleventh step is preferably performed. The eleventh step includes replacing the at least one image section of the overall image, that corresponds to at least one predefined image section of an image of a plurality of images, with at least one predefined image structure in the overall image.

Another aspect of the present invention relates to a device for producing an overall image of surroundings of a vehicle using a plurality of images. The plurality of images are actively recorded in each instance by one of a plurality of cameras mounted on the vehicle. The overall image to be produced by the device depicts the vehicle surroundings and a virtual model of the vehicle from a virtual perspective. The device preferably includes a display unit.

In accordance with the present invention, a device is provided for implementing a previously described method.

Another aspect of the present invention relates to a panoramic view system having a previously described device and four cameras that are mountable on a vehicle.

BRIEF DESCRIPTION OF THE DRAWINGS

Exemplary embodiments of the present invention are described in detail in the following with reference to the figures. Like reference numerals are used to denote like components. Each component is introduced once in each particular case. If repeated, it is treated as already described, regardless of the figure or exemplary embodiment to which a corresponding description section refers in which the respective component is repeated.

DETAILED DESCRIPTION OF EXAMPLE EMBODIMENTS

Figure 1:
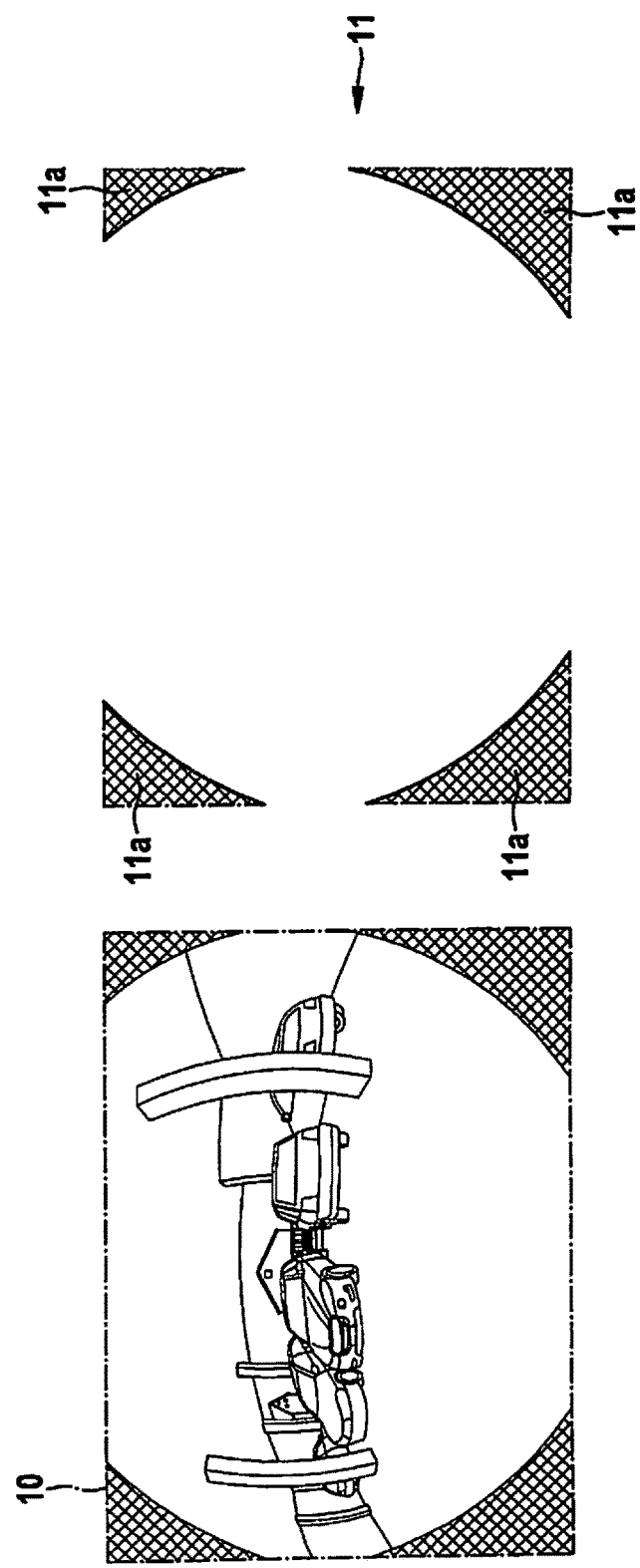
FIG. 1 shows an image from a first of four cameras of a panoramic view system that are mounted on a vehicle, and a static image mask that may be used to mask a portion of the first image.

FIG. 1 shows an image 10 from a first of the four cameras of a panoramic view system for the vehicle that are mounted on a vehicle, a camera being mounted in each particular case on each side of the vehicle.

In addition, FIG. 1 shows an image mask 11 that may be used for masking a portion of image 10 from the first camera. It is readily discernible from FIG. 1 that, subsequently to image mask 11 overlaying image 10 from first camera, image 10 of first camera is only partly masked by image mask 11, namely in regions 11a. Image mask 11 is a static image mask that is determined once for a predefined position of the first camera as a function of the current intrinsic and extrinsic calibration parameters of the first camera. Therefore, image mask 11 has a fixed form for the predefined position of the first camera.

A first specific embodiment of the present invention provides that a first panoramic view system for the vehicle include a first device for producing at least one overall image of the surroundings of the vehicle and four cameras mounted thereon. One of the four cameras is thereby mounted in a front and rear section of the vehicle, respectively. In addition, one of the four cameras is mounted on each side of the vehicle, respectively.

The principle of operation of the first device is described in connection with FIGS. 2 and 3.

The first device is designed for determining a position of each first predefined image section that at least partly forms an image of a vehicle body and occurs in one of four images that were actively recorded by the four cameras. Here, the position of each first, predefined image section that occurs in an image of the four images is determined as a function of current intrinsic and extrinsic calibration parameters of the camera that was used to actively record the respective image.

Moreover, using a first image mask, here a hatched area 23, associated with the corresponding image, the first device is designed to mask a portion of each of the four images in which a first predefined image section occurs. In addition, the first device determines each first image mask as a function of the position determined for each first predefined image section located in the associated image in such a way that it masks each first predefined image section that occurs in the associated image. A first image mask, which may be used for the image actively recorded by the respective camera, has the same shape for a predefined position of one of the four cameras and is determined once. Therefore, such a first image mask is a static image mask.

The first device is also designed for producing a first overall image 20 and a second overall image 30 of the surroundings of the vehicle by assembling the four images subsequently to the masking thereof by the first image masks. The first device is also designed in each particular case for positioning a virtual model 21 of the vehicle in an image region of first overall image 20 and of second overall image 30 whose position and view in first overall image 20 and second overall image 30 correspond to a position and view of the vehicle in the vehicle surroundings.

The first specific embodiment of the present invention provides that each second predefined image section that occurs in one of the four images and at least partly forms an image of a vehicle wheel, not be masked by a corresponding first image mask.

It is apparent from first overall image 20, as well as from second overall image 30 that an image that was actively recorded by the camera situated on the driver side of the vehicle, includes an image of a first vehicle wheel located on the driver side in the front section of the vehicle. This may be recognized on the basis of a projection 22 of the first vehicle wheel that appears in each instance in an image region of first overall image 20 and of second overall image 30 that images a ground upon which the vehicle is located. From second overall image 30, it is also apparent that an image that was actively recorded by the camera located on a passenger side of the vehicle includes an image of a second vehicle wheel located on the passenger side in the front section of the vehicle. This may be recognized on the basis of a projection 24 of the second vehicle wheel that also appears in each instance in an image region of second overall image 20 and of second overall image 30 that forms an image of a ground upon which the vehicle is located. From a first virtual perspective, first overall image 20 illustrated in FIG. 2 shows the vehicle surroundings and virtual model 21 used for the vehicle. From a second virtual perspective, second overall image 30 illustrated in FIG. 3 shows the vehicle surroundings and virtual model 21 used for the vehicle.

Moreover, in first overall image 20, as well as in second overall image 30, a region 25 is shown that forms an image of the vehicle's own shadow.

In accordance with a second specific embodiment of the present invention, a second panoramic view system for the vehicle includes a second device for producing at least one overall image of the surroundings of the vehicle and four cameras mounted thereon. In this context, the four cameras of the second panoramic view system are mounted on the vehicle in the same way as the four cameras of the first panoramic view system.

With regard to the use of the first image masks, the principle of operation of the second device is identical to that of the first device.

In addition, the second device is designed for determining a position of each second predefined image section that at least partly forms an image of a vehicle wheel and occurs in one of four images that were actively recorded by the four cameras. Here, the position of each second, predefined image section that occurs in one of the four images is determined as a function of current intrinsic and extrinsic calibration parameters of the camera that was used to actively record the respective image. Here, the position of each second, predefined image section that occurs in one of the four images is also determined as a function of a current position of the vehicle wheel that is at least partly imaged in the corresponding second predefined image section.

Moreover, the second device is also designed to mask a portion of each of the four images, in which a second predefined image section occurs, using a second image mask associated with the corresponding image. In addition, the second device determines each second image mask as a function of the position determined for each second predefined image section located in the associated image in such a way that it masks each second, predefined image section that occurs in the associated image. One second image mask that may be used for one of the four images thereby also has different shapes for different positions of a vehicle wheel whose image may be formed in the corresponding image. This occurs even when the camera, that actively recorded the respective image, is located in a predefined position. Such a second image mask is a dynamic image mask that may be variably adjusted for different positions of the corresponding vehicle wheel.

The second device is also designed for producing the at least one overall image of the surroundings of the vehicle by assembling the four actively recorded images subsequently to the masking thereof by the first and second image masks. The second device is also designed in each particular case for positioning a virtual model of the vehicle in an image region of at least one overall image whose position and view in the at least one overall image correspond to a position and view of the vehicle in the vehicle surroundings.

Consequently, the overall images produced by the second device correspond to first overall image 20 and second overall image 30, projections 22 of first vehicle wheel and projection 24 of second vehicle wheel not being present and, for example, being replaced by hatched areas or textures of the adjacent image regions.

Figure 2:
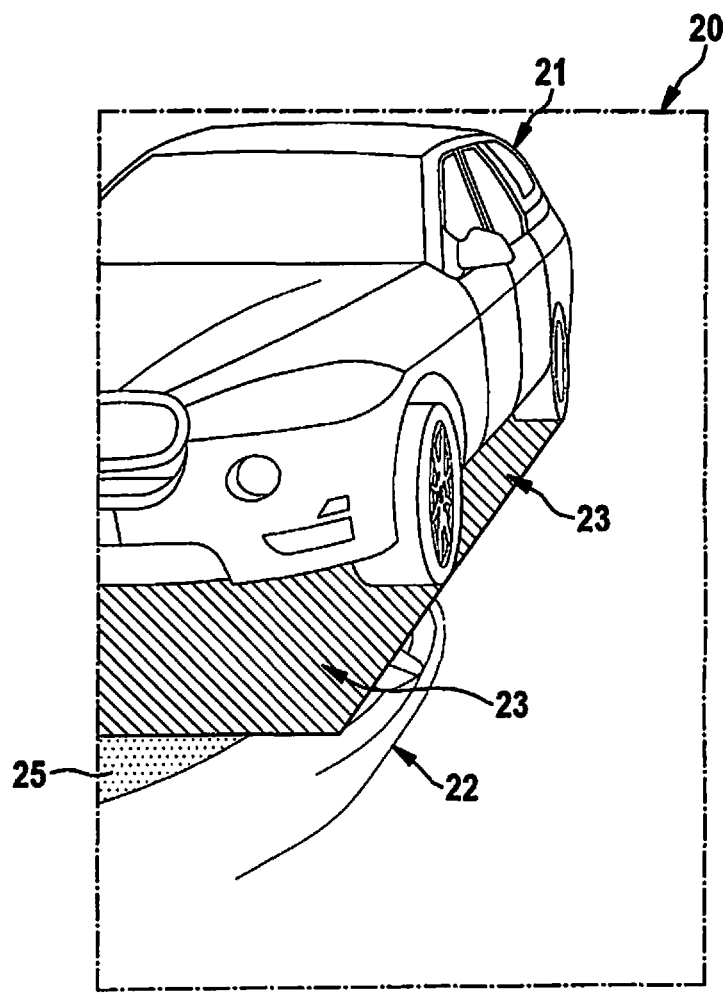
FIG. 2 shows a first overall image of surroundings of the vehicle produced in accordance with a first specific embodiment of the present invention.
Figure 3:
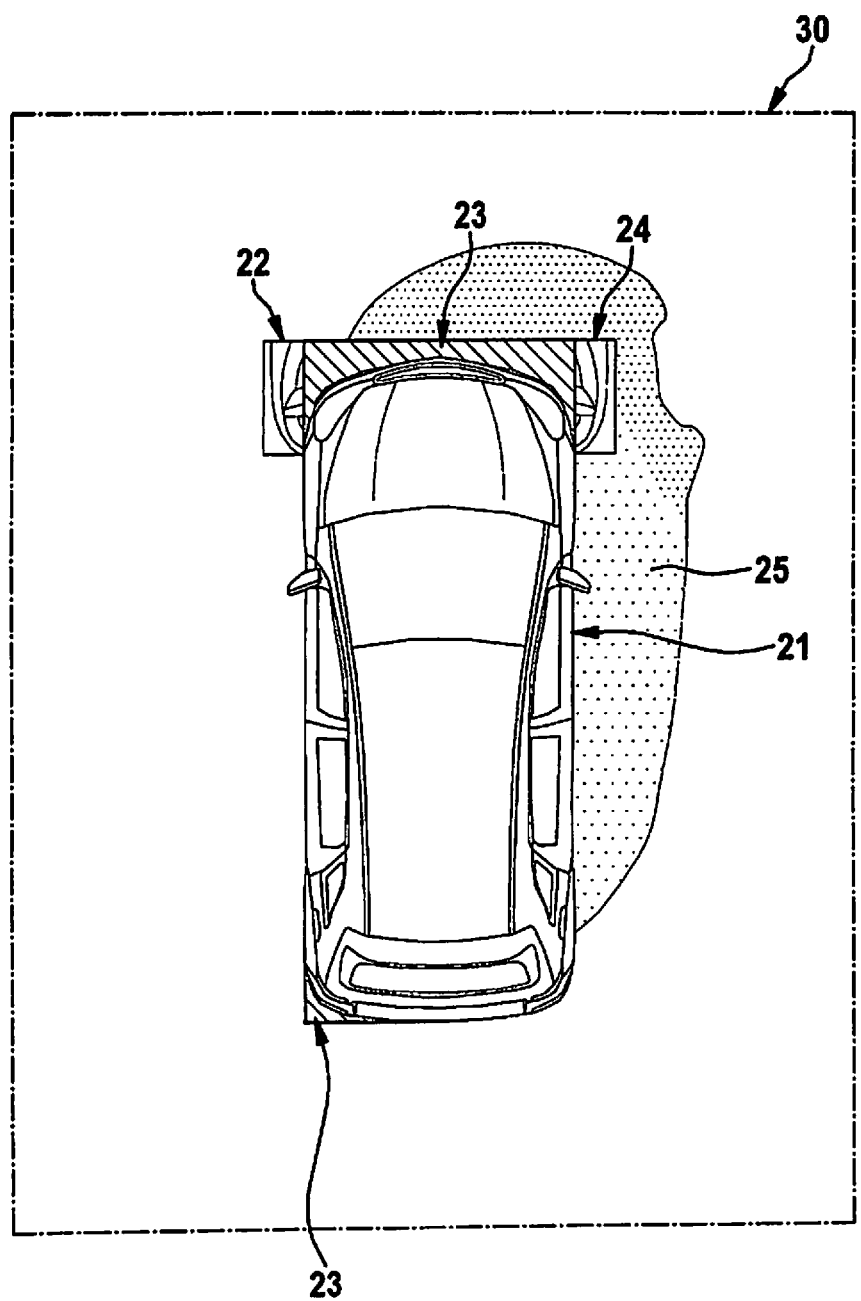
FIG. 3 shows a second overall image of surroundings of the vehicle produced in accordance with the first specific embodiment of the present invention.

In addition to the description above, reference is also hereby made to FIGS. 1 through 3 for further disclosure of the present invention.

What is claimed is:

1. A method for producing an overall image of surroundings of a vehicle using a plurality of images that are each actively recorded by one of a plurality of cameras mounted on the vehicle, the overall image thereby displaying the surroundings of the vehicle and a virtual model of the vehicle from a virtual perspective, the method comprising:
   determining a position of each predefined image section that occurs in an image of the plurality of images that at least partly forms an image of at least one of a vehicle body and a vehicle wheel;
   using an image mask associated with the respective image to mask a portion of each of the plurality of images, in which a predefined image section occurs;
   determining each image mask on the basis of the position determined for each predefined image section located in the associated image in such a way that it masks each predefined image section that occurs in the associated image;
   producing the overall image by assembling the plurality of images subsequently to the masking thereof by the associated image masks; and
   determining a current position of at least one vehicle wheel as a function of a current steering angle of the vehicle, and determining the position of at least one predefined image section, that occurs in one of the plurality of images and at least partly forms an image of the at least one vehicle wheel, on the basis of the current position of the at least one vehicle wheel and on the basis of current intrinsic and extrinsic calibration parameters of one of the plurality of cameras that was used to actively record the corresponding image.

2. The method as recited in claim 1, further comprising: determining the position of at least one predefined image section, that occurs in one of the plurality of images and at least partly forms an image of the vehicle body, on the basis of current intrinsic and extrinsic calibration parameters of one of the plurality of cameras that was used to actively record the corresponding image.

3. The method as recited in claim 1, further comprising: using a lookup table that includes a position of at least one predefined image section that may occur in each case in the corresponding position in an image of at least one of the plurality of cameras when the at least one camera is located in a predefined position, and taking the position of the at least one predefined image section from the lookup table when the at least one predefined image section occurs in the current image from the at least one camera.

4. The method as recited in claim 1, further comprising: positioning the virtual model of the vehicle in an image region of the overall image whose position in the overall image corresponds to a position of the vehicle in the surroundings thereof.

5. A device for producing an overall image of surroundings of a vehicle using a plurality of images that are each actively recorded by one of a plurality of cameras mounted on the vehicle, the overall image displaying the surroundings of the vehicle and a virtual model of the vehicle from a virtual perspective, the device being designed to:

determine a position of each predefined image section that occurs in an image of the plurality of images that at least partly forms an image of at least one of a vehicle body and a vehicle wheel;

use an image mask associated with the respective image to mask a portion of each of the plurality of images, in which a predefined image section occurs;

determine each image mask on the basis of the position determined for each predefined image section located in the associated image in such a way that it masks each predefined image section that occurs in the associated image;

produce the overall image by assembling the plurality of images subsequently to the masking thereof by the associated image masks; and determine a current position of at least one vehicle wheel as a function of a current steering angle of the vehicle, and determine the position of at least one predefined image section, that occurs in one of the plurality of images and at least partly forms an image of the at least one vehicle wheel, on the basis of the current position of the at least one vehicle wheel and on the basis of current intrinsic and extrinsic calibration parameters of one of the plurality of cameras that was used to actively record the corresponding image.

* * * * *